June 30, 1925.
T. E. ODERMAN
1,544,339
BACON SKINNER
Filed Nov. 12, 1923        3 Sheets-Sheet 1
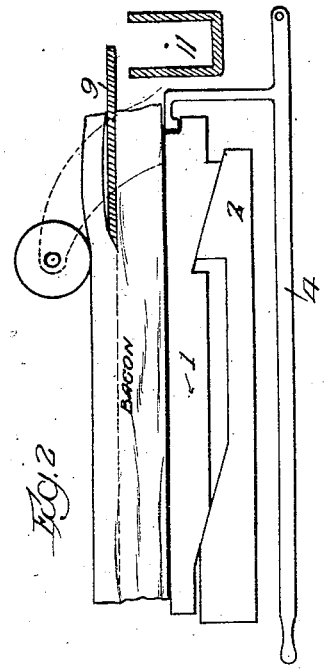
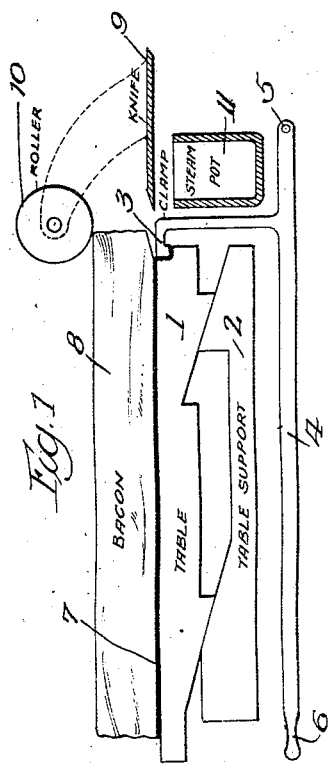
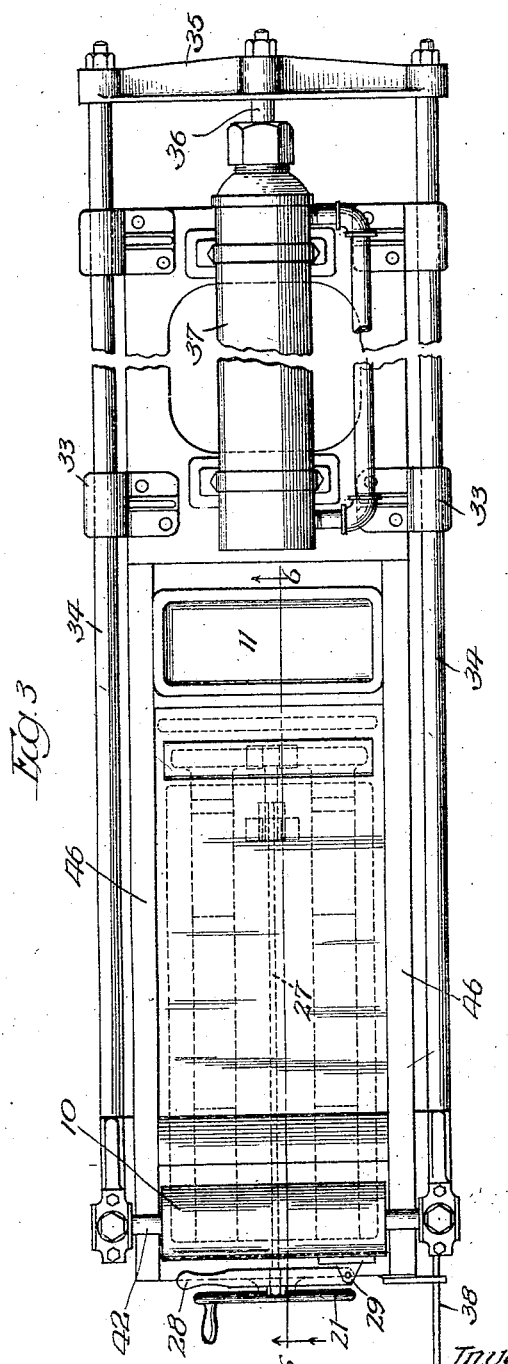
Inventor
Theodore L. Oderman.
by Albert Scheith,
Atty.

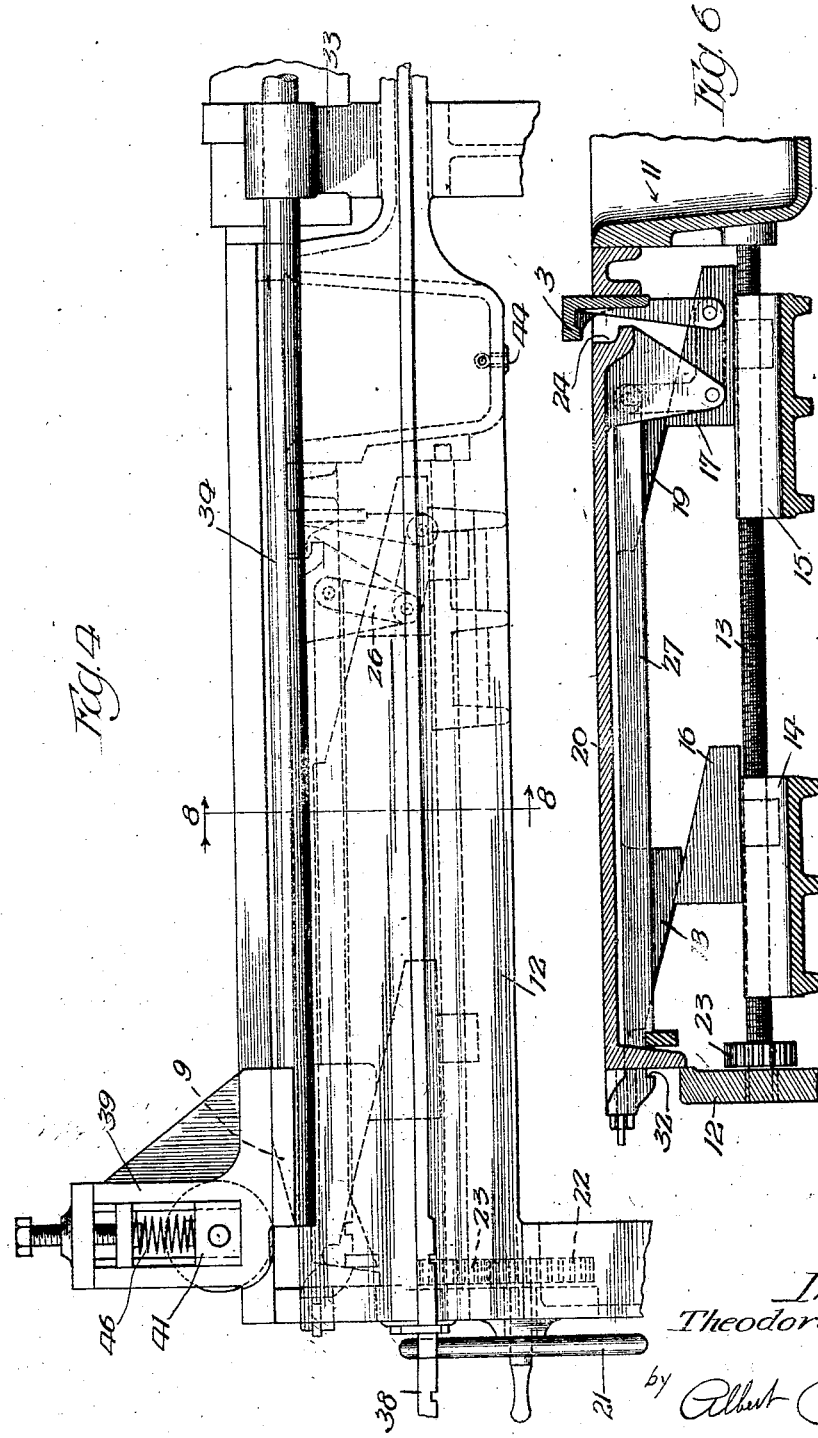

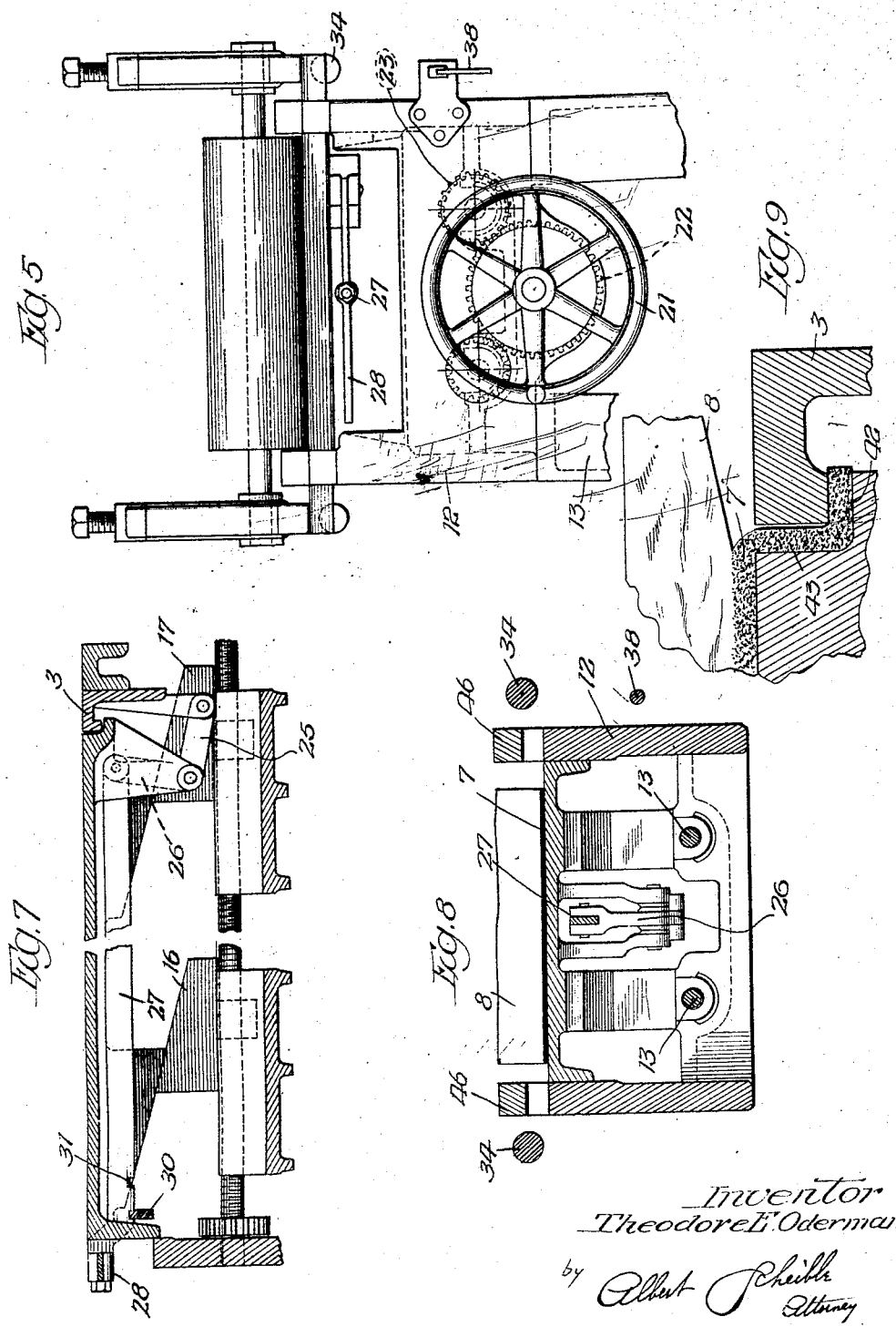

Patented June 30, 1925.

1,544,339

UNITED STATES PATENT OFFICE.

THEODORE E. ODERMAN, OF OKLAHOMA CITY, OKLAHOMA.

BACON SKINNER.

Application filed November 12, 1923. Serial No. 674,209.

*To all whom it may concern:*

Be it known that I, THEODORE E. ODERMAN, citizen of the United States, residing at Oklahoma City, in the county of Oklahoma and State of Oklahoma, have invented certain new and useful Improvements in a Bacon Skinner; and I do hereby declare the following to be a full, clear, and exact description of the invention, such as will enable others skilled in the art to which it appertains to make and use the same.

My invention relates to machines for removing the skin or rind from slabs of bacon and for cutting such bacon into slabs of a suitable thickness.

In utilizing the sides of bacon effectively and economically, it is customary to market the bacon in slices of a predetermined width so as to fit the cartons. Where the bacon is taken from a side which originally exceeded this desired width in thickness, it is desirable that the bacon be taken from the portion farthest from the skin, as the portion close to the skin is not streaked with lean meat. Furthermore, it is desirable that the skin should be cut off as close as possible to the bacon proper, so as to avoid the retaining on the skin of fat which brings a much higher selling price when detached and reduced to lard.

Owing to the tendency of the skin of the bacon to wrinkle, it has heretofore been customary to do the needed skinning by hand, thereby requiring highly skilled men and involving a slow process. My invention aims to avoid such manual labor by providing a speedily operating machine for this purpose, and more particularly, by providing a machine which will be equally effective for initially detaching the desired standard thickness of the bacon and for afterwards removing the skin from the remaining fatty portion. Furthermore, my invention provides simple and effective means for preventing the skin from wrinkling and for maintaining the knife or cutter at a temperature which will make it highly efficient in its cutting action.

More particularly, my invention provides simple means for clamping a partly loosened end of the skin on a side of bacon to a table, for moving a cutter in the proper plane so as to sever the skin closely from the bacon proper, for heating the knife to expedite its cutting action, and for compressing the side or slab of bacon ahead of the knife so as to flatten out any wrinkles in the skin. It also provides simple and effective means for adjusting the height of the table with respect to the knife and for locking this adjustment either in a position in which the knife will cut off a slab of bacon of a predetermined thickness or one in which the knife will move close to the skin. Still further and also more detailed objects will appear from the following specification and from the accompanying drawings, in which Fig. 1 is a diagram showing the general arrangement of the parts when the knife is ready to skin the bacon.

Fig. 2 is a similar diagram, showing the bacon carrying platen as lowered so as to cause the knife to cut the desired thickness off a slab of bacon of greater thickness.

Fig. 3 is a plan view of a pressure-actuated machine embodying my invention.

Fig. 4 is a front elevation of the same.

Fig. 5 is an end elevation of the same machine, taken from the left-hand end of Fig. 4.

Fig. 6 is a fragmentary central and longitudinal section through the machine, taken along the correspondingly numbered line in Fig. 3 and showing the skin clamp in its raised position.

Fig. 7 is section similar to Fig. 6, but showing the skin clamp in its lowered or clamping position.

Fig. 8 is a transverse section through the machine, taken along the lines 8—8 of Figs. 3 and 4.

Fig. 9 is an enlarged sectional view, showing the initial clamping of the end of the bacon rind.

Referring first to the diagrams of Figs. 1 and 2, these show a table or platen 1 superposed on a table support 2, the table having its top recessed at its rear end so as to provide a depression for receiving the jaw of a skin clamp 3. This skin clamp is mounted on a lever 4 pivoted on a pin 5, so that the clamp can be raised or lowered by rocking the lever about this pivot pin.

When used for removing the skin or rind 7 from a side or slab of bacon which has its main portion 8 of the desired thickness, the skin is cut loose from the rear end of the slab with a hand knife for a short distance, thereby permitting the loosened end portion of the skin to be slipped under the raised clamp 3 when the bacon is placed on the table 1, after which the clamping lever 4 is lowered so as to cause the clamp to grip the loosened end of the skin as shown in Fig. 1. The remainder of the skin is then removed by means of a knife or cutter 9 which is mounted for movement in a plane slightly above the top of the table 1 and which moves towards the left in Fig. 1. When the knife thus moves towards the left hand end of the machine, the resistance to its action automatically tends to stretch the skin of the bacon, but this action may not be sufficient to flatten out wrinkles in the skin and hence the cutting action might not closely follow the top of the skin. To prevent such a crinkling, which might either cause portions of the skin to be left on the severed bacon slab or might leave a considerable amount of fat attached to the skin, I mount a roller 10 so that it will travel ahead of the knife and will compress the slab of bacon. Then I also provide suitable heating means for warming the knife to keep it in a rapid cutting condition, which I desirably do by mounting a steam pot 11 so that the knife will be disposed above it whenever the knife is in its retracted position.

If the original side of bacon is of a thickness exceeding the desired width of the bacon which is to be packaged in sliced form, I first lower the table so as to take an initial cut which will sever the desired thickness of bacon from the slab and will leave the skin attached to the surplus fat. This I desirably do by providing the table 1 and the table support 2 with cooperating cam formations so as to cause a relative sliding movement of the same to lower the table, as more fully described hereafter.

Referring now to the commercial embodiment of my machine as shown in Figs. 3 to 9 inclusive, this comprises a supporting frame 12 having legs 13 of a suitable height and having a pair of adjusting screws 13 extending longitudinally of the same. Each of these screws is threaded through a pair of sleeves 14 and 15 spaced longitudinally of the machine and each of the sleeves carries a cam plate having an upper surface which is inclined towards the rear end of the machine, these being the cam plates 16 and 17 of Figs. 6 and 7. Resting upon the inclined tops of these cam plates are similarly sloping lugs 18 and 19 formed upon the bottom of a table or platen 20, which table is held against longitudinal movement by engagement with suitable frame portions, as for example by bearing against the frame portion 12 of Fig. 6. Thus arranged, the table can readily be raised or lowered by moving the cams 16 or 17 through the screws 13, such a movement being effected by turning a hand wheel 21 disposed at the forward end of the machine and having its shaft fastened to a gear wheel 22 which meshes with a pair of pinions 23 respectively mounted on the two screws 13.

The upper surface of the table 20 is depressed at its rear end to form a recess 24 as shown in Fig. 6, which recess is adapted to receive the loosened rear end portion of the skin on a slab of bacon resting on the table. Adjacent to this recess I dispose a clamping portion of the jaw member 3 which is pivoted to one arm 25 of a bell-crank lever. This bell-crank lever has its other arm 26 connected through a link 27 with a hand lever 28, the last named lever being disposed at the front of the machine and mounted on a pivot 29 on the table so that a movement of this lever about its said pivot will move the link 27 and cause the latter to move the clamping jaw through the said bell crank. The link 27 desirably slides over a cross bar 30 extending across the machine under the table and this link desirably has a pair of notches 31 (Fig. 2) and 32 (Fig. 6) adapted to latch on the cross bar 30. The position of these notches corresponds respectively to the raised or loosened position of the clamping jaw 3 and to the depressed or clamping position of this jaw, and either notch prevents an accidental movement of the clamping jaw, so that these notches on the link 27 serve to hold the clamping jaw positively in either its clamping or its opened position.

Mounted on opposite sides of the frame of the machine are guides 33 which are bored to fit sliding rods 34 extending longitudinally of the frame, these rods being guided so as to be disposed parallel to the top of the table 20 at all times. The two rods 34 are connected at the rear of the machine by a cross-bar 35 to a piston rod 36 which extends into a pressure cylinder 37 and is secured to a piston within this cylinder, so that this piston together with the sliding rods 34 can be moved back and forth by admitting fluid under pressure to one or the other end of the cylinder. Details of the piston mechanism or the control for the same are not illustrated here, as arrangements for this purpose are well known, but the control lever 38 desirably extends to the front end of the machine so as to be within easy reach of the operator who also manipulates the hand wheel 21 and the height adjusting lever 28.

Connecting the forward ends of the sliding rods 34 is a frame 39 which has a knife or cutter 40 secured to it and which also has vertical guideways for bearings 41 in which a shaft 42 is journaled. This shaft, which is disposed forwardly of the cutting edge of the knife 40, carries the roller 10 employed for compressing the bacon sufficiently to prevent the skin from wrinkling.

To make the clamping of the skin by the jaw 3 highly effective, I desirably shape the recess 24 at the rear end of the table or platen 20 so that this will have a bottom ledge 42 against which the tip portion of the severed skin 7 is pressed downwardly by the clamping action of the jaw 3, this recess also having a vertical ledge 42 for resisting the forward pull on the skin due to the resistance offered to the cutting action of the knife. With the cooperating clamping parts thus arranged, as shown on an enlarged scale in Fig. 9, the two bends formed in the rear end portion of the partly detached skin cooperate with the gripping action of the clamp 3 in affording a firm hold, so that I readily avoid any slipping which might otherwise be due to the slipperyness of the skin or to variations in its thickness. Consequently, no adjustment in this respect is required.

All that the operator has to do is to loosen the rear end of the skin on the side or slab of bacon, slide this into the position indicated in Fig. 9 while the jaw 3 is in the raised position of Fig. 6, and then depress the jaw by moving the hand lever 28 at the forward end of the machine. While this is being done, the knife is in its retracted or starting position, corresponding to that shown in the diagram of Fig. 1, so that it is subject to the heating action of steam admitted to the steam pot 11, to which steam is supplied through the inlet 44 shown in Fig. 4. The piston, sliding rods 34, and cross-head 39 together with the roller 10 are at that time all at the rear end of their travel, and the roller is adjusted in height against the pressure of springs 46 which urge the bearings 41 downwardly, according to the thickness of the slab of bacon. If the original thickness exceeds that corresponding to the standard width of the proposed bacon slices, the hand wheel 21 is first turned so as to move the cams or wedges 16 and to lower the table or platen until the top of the bacon is at a certain distance above the horizontal plane in which the knife travels.

In order that the operator can readily gage the height of the table so as to make the initial cut furnish the right thickness of bacon, I preferably provide guides at opposite edges of the table having sight edges at the required height above the cutting plane of the knife. For this purpose I desirably employ the guides 46 which also guide the frame 39 of the cutter and roller assembly, so that by sighting across the tops of these guides while lowering his table, the operator can quickly bring the top of the clamped slab of bacon to the same level with these tops. Thus, if 1¾ inch slices of bacon are to be desired the guides 46 in Fig. 8 have their upper horizontal surfaces in a plane just that much above the cutting edge of the knife.

When the table has thus been adjusted, fluid pressure is admitted to the rear end of the cylinder 37 to move the piston, roller and knife forwardly and to cut off the standard thickness of the slab of bacon. As soon as this has been done, the roller and knife are retracted by an opposite movement of the piston and the table is raised by again moving the hand wheel 21, so as to bring the top of the skin into the said cutting plane of the knife. Then the next forward movement of the knife detaches the skin from the fatty remainder of the bacon and a movement of the hand lever 28 causes the clamping jaw to release this skin. In practice, both the simple adjustments and the two cuts as required in bacon slabs exceeding the said standard thickness can all be made very quickly, so that a single operator can effectively trim and skin a large number of slabs of bacon per hour. Furthermore, the action of the pressure roller readily cooperates with the pulling action of the cutter on the skin to flatten out any wrinkles in the latter, thereby permitting the bacon to be detached quite completely from the skin and hence avoiding any material loss of the bacon fat through having portions thereof left attached to the skin.

However, while I have illustrated and described my machine in a commercial embodiment including a pair of parallel guide rods, a piston mechanism for operating the same, and including certain desirable arrangements for the height adjustments and for the clamping of the skin, I do not wish to be limited to these or other details of the construction and arrangement here disclosed. Obviously, these might be varied in many ways without departing either from the spirit of my invention or from the appended claims.

I claim as my invention:—

1. In a bacon skinning machine, a substantially horizontal support, reciprocal cutting means movable parallel to the support, and means to grip the skin at an edge thereof, said cutting means being movable past the gripping means on the retrograde stroke thereof to expose the gripping means.

2. In a bacon skinning machine, a support, means to hold the skin thereon, reciprocal cutting means above the support, and heating means located for registry with the cutting means at approximately the end of the retrograde stroke thereof for heating the cutting means only when in register therewith and prior to inception of the cutting stroke.

3. In a bacon skinning machine, a support, means to hold the skin thereon, reciprocal cutting means above the support and a steam pot having an open top located beneath and for registry with the cutting means at approximately the end of the retrograde stroke thereof and in close relation thereto for imparting heat to the cutting means only when in register therewith and prior to inception of the cutting stroke.

4. In a bacon skinning machine a substantially horizontal support, reciprocal cutting means movable parallel to the support, means to fixedly hold the skin on the support, and means to reciprocate the cutting means with the skin held against movement.

5. In a bacon skinning machine, a support, means for gripping one end of the skin of a slab of bacon bearing against the support, a cutter movable parallel to the bacon-supporting surface of the support, means movable conjointly with the cutter for compressing the slab of bacon in advance of the cutter, and means for adjusting the distance from the slab-supporting surface to the cutter and therewith the compressing means.

6. In a bacon skinning machine, a support, means for gripping one end of the skin of a slab of bacon bearing against the support, a cutter movable parallel to the bacon-supporting surface of the support, means movable conjointly with the cutter for compressing the slab of bacon ahead of the cutter, means for adjusting the distance from the slab-supporting surface to the cutter and therewith the compressing means and separate means for adjusting the compressing means.

7. A bacon skinning machine comprising a support for a slab of bacon, means on the support for gripping one end of the skin of the bacon, a cutter mounted for reciprocating movement parallel to the bacon-supporting surface of the support, and means acting upon the cutter only when the latter is retracted for heating the cutter prior to each cutting stroke.

8. A bacon skinning machine as per claim 7, in which the heating means comprise means for exposing the cutter to a hot fluid.

9. A bacon skinning machine as per claim 7, in which the heating means comprise a pot of boiling water disposed below the cutter at the beginning of the cutting stroke of the latter.

10. In a bacon skinning machine, a support, means for gripping one end of the skin of a slab of bacon bearing against the support, a cutter movable parallel to the bacon-supporting surface of the support, means for adjusting the distance between the cutter and the bacon-supporting surface, and a gage disposed at a fixed height above the cutter and adapted to aline with the fatty face of the slab of bacon when the aforesaid distance is suitably adjusted.

11. In a bacon skinning machine, a support, means for gripping one end of the skin of a slab of bacon bearing against the support, a cutter movable parallel to the bacon-supporting surface of the support, means for adjusting the distance between the cutter and the bacon-supporting surface, and guides arranged both for guiding the cutter and for indicating a plane disposed at a fixed distance above the plane in which the cutter moves.

12. In a bacon skinning machine, a support, means for gripping one end of the skin of a slab of bacon bearing against the support, a cutter movable parallel to the bacon-supporting surface of the support, means for adjusting the distance between the cutter and the bacon-supporting surface, and sighting means for indicating a plane disposed at a fixed distance above the plane in which the cutter moves.

13. In a bacon skinning machine, a supporting member, a table for receiving a slab of bacon, cooperating cam means respectively carried by the table and the supporting member, one of the cam means being slidable longitudinally and means for relatively moving the said slidable cam means to vary the height of the table with respect to the supporting member.

14. In a bacon skinning machine, a supporting member, a table mounted thereon for movement transverse to the face of the table, cutting means movable parallel to the face of the table, bacon-skin clamping means associated with the table, and means for raising or lowering the table and therewith the said clamping means.

15. In a bacon skinning machine, bacon supporting means including a bacon-supporting table having a rearwardly extending ledge disposed below the top of the table, a clamping member having a jaw overhanging the said ledge, the clamping member being movable from a position in which the jaw is disposed close to the said ledge to a position in which the jaw is disposed above the top of the table, and means mounted on the table for moving the jaw comprising a lever pivoted to the jaw and a link connected to the lever and operable from the forward end of the table.

16. In a bacon skinning machine as per claim 15, jaw moving means comprising a lever pivoted to the jaw and a link connected to the lever and operable from the forward end of the table, the link having a pair of relatively spaced latching formations, and a latching member carried by the table and adapted to engage either of the said formations.

17. In a bacon skinning machine as per claim 15, jaw moving means comprising a lever pivoted to the jaw and a link connected to the lever and operable from the forward end of the table, the link having a pair of relatively spaced latching formations, and a latching member carried by the table and adapted to engage either of the said formations, in combination with means mounted on the table and connected to the link for releasing the link from the latching formations and for shifting the position of the link when so released.

18. A bacon skinning machine comprising a supporting member, a traveling member mounted for horizontal movement over the top of the supporting member, a bacon supporting table carried by the supporting member and having a horizontal top, the said traveling member including a cutter disposed higher than the said top, clamping means for securing the skin of the bacon to the table, and means interposed between the supporting member and the table for varying the height of the table without disturbing the operative relation of the clamping means to the table.

19. A bacon skinning machine as per claim 18, in which the said interposed means comprise inclined members carried by the table, a rotatable member carried by the supporting member, and inclined members threaded upon the rotatable member and engaging the aforesaid inclined members.

20. A bacon skinning machine as per claim 18, in which the said interposed means comprise a rotatable member carried by the supporting member, and supporting elements threaded upon the rotatable member, the table having portions engaging the supporting elements and the supporting elements being so arranged as to raise or lower the table upon movement of the rotatable member in one direction or the other.

Signed at Oklahoma City, Oklahoma, October 29, 1923.

THEODORE E. ODERMAN.